J. T. STURTEVANT.
Dinner-Pails.
No. 134,175. Patented Dec. 24, 1872.
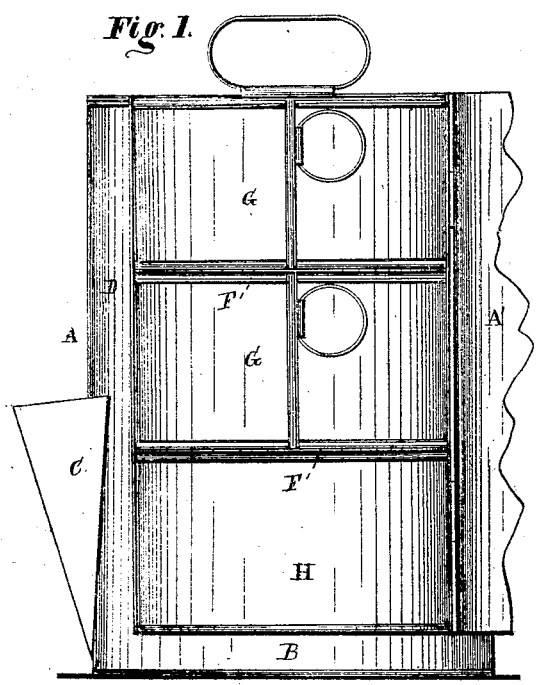
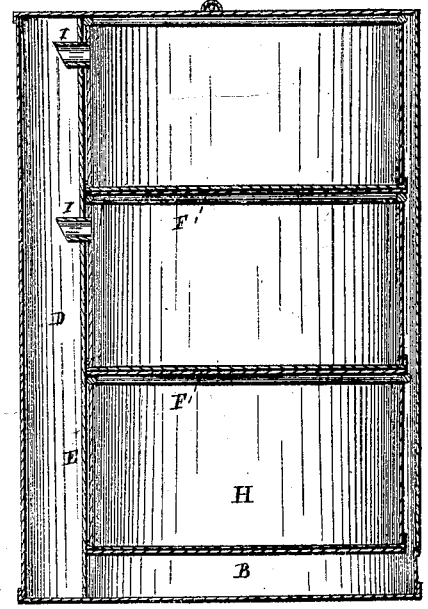
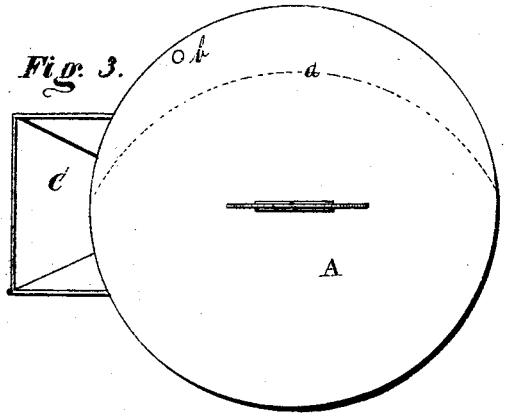
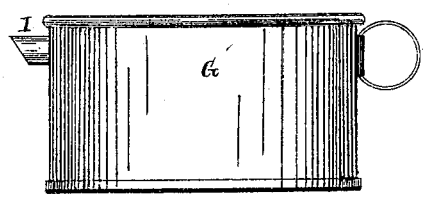
Witnesses,
R. C. Stanly
H. F. Cornett
Inventor.
J. T. Sturtevant
Per Burridge & Co.
Attys

UNITED STATES PATENT OFFICE.

JAIRUS T. STURTEVANT, OF CLEVELAND, OHIO.

IMPROVEMENT IN DINNER-PAILS.

Specification forming part of Letters Patent No. 134,175, dated December 24, 1872.

*To all whom it may concern:*

Be it known that I, JAIRUS T. STURTEVANT, of Cleveland, in the county of Cuyahoga and State of Ohio, have invented a new and Improved Dinner-Pail, of which the following is a description:

Figure 1 is a side view of the dinner-pail with the door open. Fig. 2 is a transverse vertical section. Fig. 3 is a top view. Fig. 4 is a detached section.

Like letters of reference refer to like parts in the several views.

The nature of this invention relates to a dinner-pail; and it has for its object the warming or heating of the articles prepared for dinner by means of water contained in a reservoir forming the bottom of the pail, the water being heated by standing the pail on a stove or over the fire, the heat and steam of which will warm the contents of the pail.

The following is a description of the invention: Fig. 1 represents the pail with the door A open. Said pail is of the usual size and shape. At the bottom of the pail is formed a reservoir, B, Fig. 2, to which communication is had from the outside by means of the lip C, Fig. 3, projecting from the side of the pail. The bottom of the lip opens into the reservoir, and into which the water is poured for filling the reservoir. On one side of the pail is formed a flue or steam-chamber, D, Fig. 2, by means of the curved wall E, Fig. 2, also indicated by the dotted lines $a$, Fig. 3. In said pail are shelves F on which are placed the vessels G containing the food, whereas in the vessel H at the bottom is put the tea or coffee for drink. In one side near the brim of each vessel G is a short tubular spout, I, Fig. 4, which, when the vessel is on the shelf, projects through the wall E into the steam-chamber, as shown in Fig. 2, the purpose of which is to convey from the vessel all odors and steam that may arise while the contents are being heated. A small hole, $b$, in the top of the chamber allows the steam to escape therefrom to the outside, and also the steam that may be generated on heating the water in the reservoir.

By the use of the above-described pail the articles contained in the vessels for dinner are easily and thoroughly warmed by simply standing the pail on the stove or over the fire. The water in the reservoir soon becomes heated, and the steam thereof rising up in the chamber D communicates the heat to the vessels, thereby warming their contents, and at the same time all excess of steam and that arising from each vessel and the odors thereof escape to the outside through the vent $b$ referred to.

Claim.

What I claim as my invention, and desire to secure by Letters Patent, is—

The herein-described dinner-pail consisting of the reservoir B, lip C, flue or steam-chamber D having holes in the side thereof for the admission of the spout I of the vessels G, and pail A, all constructed and arranged as described, and for the purpose set forth.

JAIRUS T. STURTEVANT.

Witnesses:
JOHN H. BURRIDGE,
A. F. CORNELL.